J. Emerson,

Dynamometer.

No. 98,043. Patented Dec. 21, 1869.

Witnesses.

Inventor.
James Emerson

United States Patent Office.

JAMES EMERSON, OF LOWELL, MASSACHUSETTS.

Letters Patent No. 98,043, dated December 21, 1869.

IMPROVEMENT IN DYNAMOMETERS.

The Schedule referred to in these Letters Patent and making part of the same.

*To all persons to whom these presents may come:*

Be it known that I, JAMES EMERSON, of Lowell, of the county of Middlesex, and State of Massachusetts, have made a new and useful invention, having reference to Dynamometers, or apparatus for measuring the power employed in propelling or revolving a turbine-wheel or a vertical shaft; and I do hereby declare the said invention to be fully described in the following specification, and represented in the accompanying drawings, of which—

Figure 1:
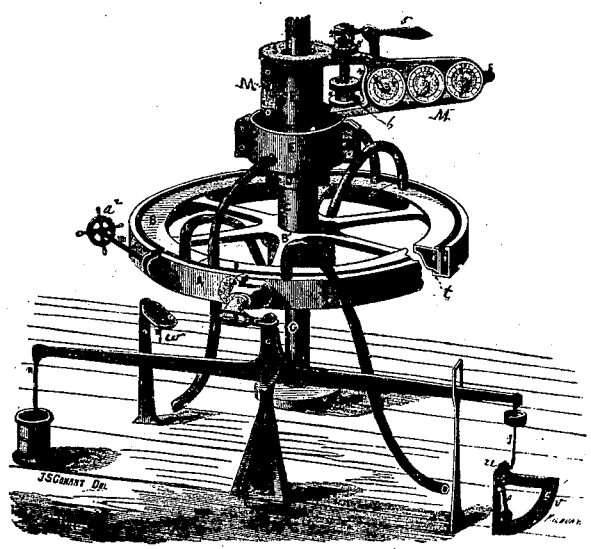

Figure 1 is a perspective view of one of my improved or new dynamometers, the rim and friction-band of its wheel being represented as broken away, in order to exhibit their internal construction.

In the said drawing—

G is a vertical shaft, which may be that of a turbine water-wheel.

There is fixed on this shaft, concentrically therewith, a wheel, B, which, for the purpose of being readily attached to or removed from the shaft, I form in halves, provided with means of connecting them together and to the shaft.

The rim of each of the said parts, I make tubular or hollow, as shown at $i'$, from end to end, and by means of one of two tubes, $k\ k$, I connect the hollow space, or chamber, or bore $i'$ of each of the said parts of the wheel rim, with a cup, or vessel, E, fixed on the shaft of the wheel. Such vessel may be made in halves or parts, and be provided with flanges and screws for fixing it to the shaft or enabling it to be readily removed therefrom.

An eduction-pipe, as shown at I, may be led out of each of the sections of the wheel-rim.

The wheel so made is surrounded by a friction-band, A, clamped to the periphery of the wheel by a screw, $m$.

This band is a hollow ring, the section of its water-chamber being shown at $i$.

An induction-pipe, $h$, should lead into the chamber $i$ of the ring, and there should also be an eduction-pipe, $p$, leading out of such chamber.

An arm, extending from the friction-band, is shackled to a tri-armed lever, $c$, pivoted to a standard, $d$.

This lever may have beneath one end of it a dash-pot, $g$, to receive a piston, $n$, suspended from the lever.

A chain, $f$, extending from the other end of the lever, carries a weight, $d$, and below the weight the chain is fastened to the peripheries of a small wheel, $u$, or fixed on the arbor of a weighted or pendulous index-arm, $f$, of a divided quadrant, $r$, as shown in the drawing.

An arm, M, applied to the shaft G, so as to revolve thereon, carries a registering-apparatus, or mechanism for determining the velocity of the shaft, a gear-wheel, 3, fixed to the shaft, serving to drive a pinion, 3', which is arranged on a small upright shaft, 1, disposed within the arm M.

A clutch, 2, carried by a lever, 5, serves to couple the pinion to the shaft or uncouple it therefrom.

A small tubular shaft, 6, fitted to slide vertically on the shaft 1, carries two endless screws, or worms, $Q\ Q'$, the thread of one being pitched in a direction opposite to that of the other.

By running or sliding vertically the tubular shaft 6 on the shaft 1, either worm may be brought into engagement with the driving worm-gear 4 of the clockwork or register. The tubular shaft, when arranged in either of its positions, should be held there by suitable means, as a pin, for instance, going through it and the shaft 1.

Thus, whichever way the wheel B may be revolved, the indices of the registering-apparatus may be made to travel in one or the same direction. This would not be the result were but one worm used. The additional worm is, therefore, a feature of advantage.

Furthermore, the friction-band A is constructed with a trough, or gutter, $t$, to extend from it underneath the rim of the wheel, such trough being to catch the waste oil which may drop from the band and wheel, and convey it to and discharge it into a receiver, shown at $w$.

In order to prevent the wheel and friction-band from becoming heated, cool water, by means of the pipes of induction and eduction, as described, is to be caused to pass through the chambers of both wheel and band.

The weight applied to the chain $f$ of the pendulous arm serves not only to counterbalance a part of the tractile force exerted on the lever by the friction-ring, while the dynamometer may be in use, but also to prevent sudden and improper vibrations of the pendulous index-arm, it answering the purpose of the dash-pot, with its friction and charge of fluid.

The arm M of the velocity-measuring-apparatus is to be held stationary while the shaft G may be in revolution.

The mode of operation of the above-described dynamometer, to measure the force of propulsion of the shaft G, or the duty to be performed by the turbine, is essentially the same as that of various other dynamometers.

In order to prevent a person, while hold of the wheel $a^2$ of the screw $m$, or its handle, from pushing or pulling on the screw-shaft, so as to force or draw the friction-ring A in a horizontal direction, and thereby vary the tractive force of the ring on the lever $c$, and thus cause the indicating-arm $f$ to wrongly denote on the quadrant limb $r$ the force of friction of the wheel B, the said wheel $a^2$ may slide on the shank of the screw, and be connected therewith by a "feather-connection," or the shank may be prismatic in form, and enter a correspondingly-formed hole made in the central part of the handle-wheel $a^2$. Thus any pressure or pull on the handle-wheel, in the direction of the axis of its shaft, will move the wheel on the shaft, without having any tendency to move the friction-ring A, as above mentioned.

Figure 2:
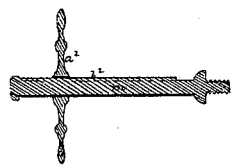
Figure 3:
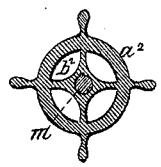

Figure 2 of the drawings is a longitudinal section of the handle-wheel, and its screw-shaft is connected by the "feather-connection" $b^2$, such also being shown in Figure 3, which is a transverse section of the two.

In these drawings, $a^2$ denotes the wheel, and $m$ the shaft.

Having thus described my improved dynamometer, what I claim therein, as of my invention, is as follows, that is to say, I claim—

1. The combination of a hydraulic cooling-apparatus, as described, or its equivalent, with the wheel of the dynamometer, to operate with and keep such wheel cool, under circumstances as specified.

2. The combination of a hydraulic cooling-apparatus, as described, or its equivalent, with the friction-band of a dynamometer, to operate therewith, substantially as specified.

3. The combination, as well as the arrangement of the drip-trough, or channel $t$ with the dynamometer-wheel and friction-band, as described.

4. The combination of the auxiliary worm, or its equivalent, with the mechanism for measuring the velocity of the wheel.

5. The combination of the friction-clutch, or its equivalent, with the mechanism for measuring the velocity of the wheel.

6. The combination of the quadrant limb, the index-pendulum, or weighted arm, its pulley and chain, and the main weight, with the lever, combined with, or to be combined with a dynamometer, as set forth.

7. In the dynamometer, the application of the handle-wheel $a^2$ to its shaft $m$, so that the two shall revolve together, but the wheel be movable endwise on the shaft, as and for the purpose as specified.

JAMES EMERSON.

Witnesses:
R. H. EDDY,
J. R. SNOW.